Patented Mar. 8, 1932

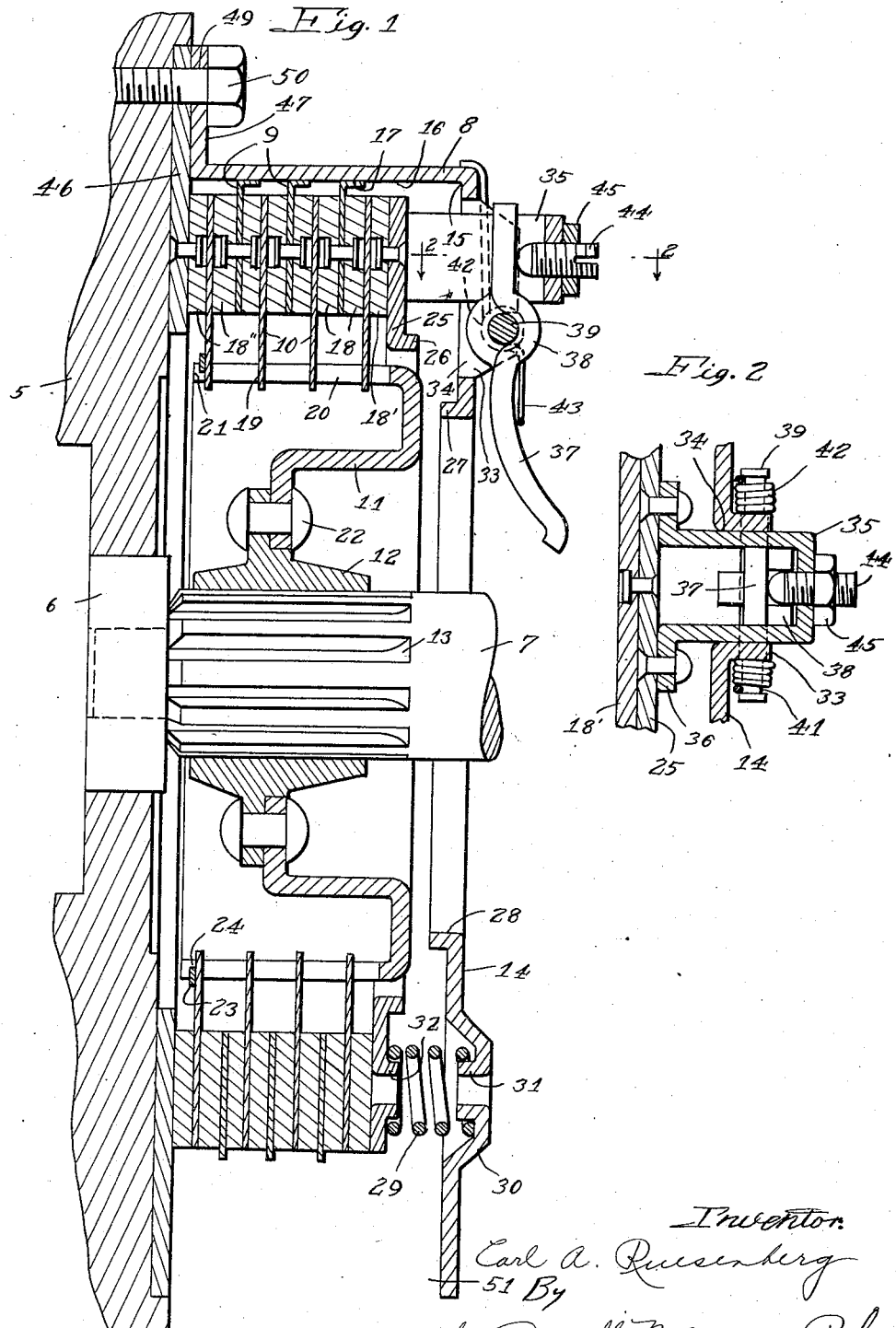

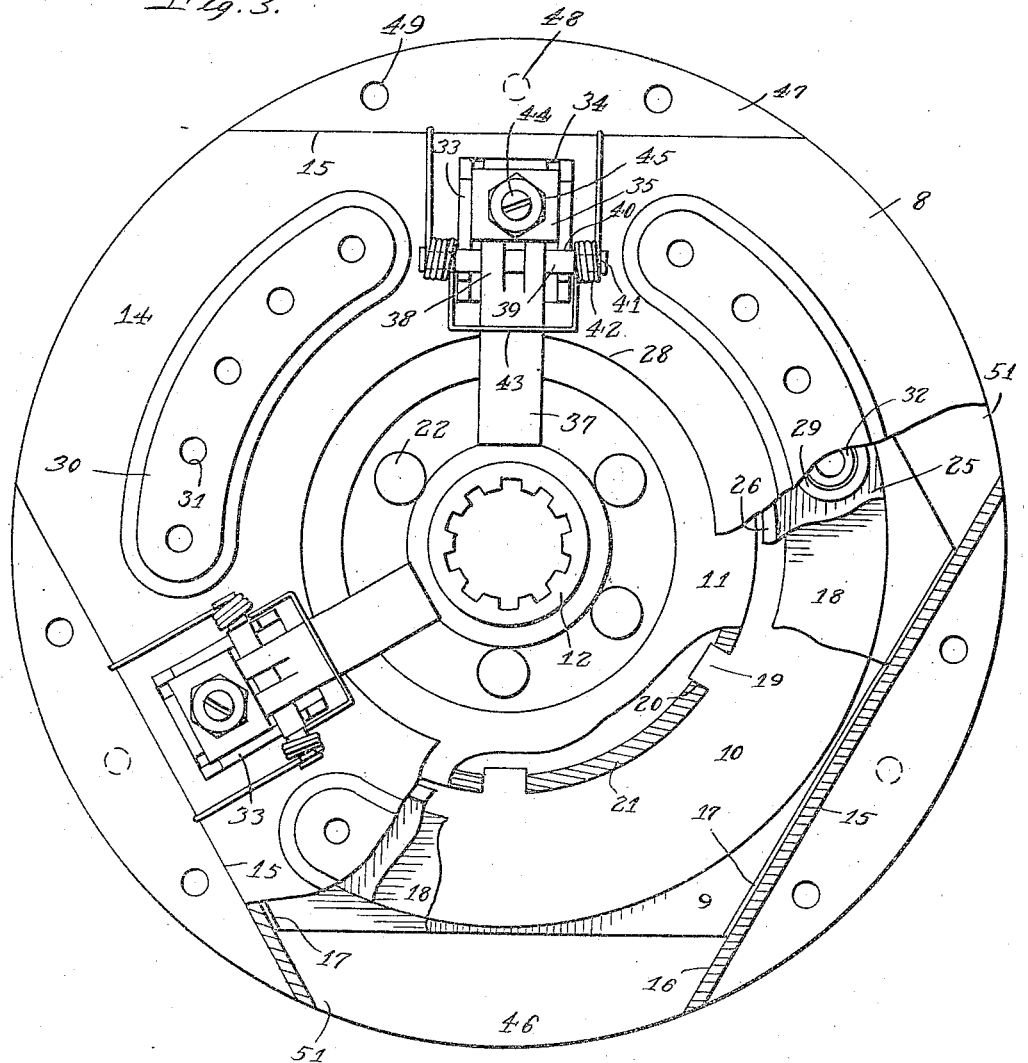

1,848,843

UNITED STATES PATENT OFFICE

CARL A. RUESENBERG, OF ROCKFORD, ILLINOIS, ASSIGNOR TO ROCKFORD DRILLING MACHINE CO., OF ROCKFORD, ILLINOIS, A CORPORATION OF ILLINOIS

MULTIPLE DISK CLUTCH

Application filed March 28, 1930. Serial No. 439,565.

This invention relates to multiple disk clutches generally, but has more particular reference to one designed primarily for use on motor vehicles.

Multiple disk clutches, as heretofore designed, have invariably been of extremely massive and heavy construction and involved expensive machining and assembling. As a result, such clutches were suitable only for heavy trucks and busses, where this clutch weight could be overlooked. It is, therefore, the principal object of my invention to provide a multiple disk clutch which is almost entirely of stamped sheet metal construction for lightness and cheapness, as well as greater compactness, the greater part of the machining work otherwise necessitated being eliminated, and the assembling operations reduced to practically a absolute minimum. The resulting light, compact, and comparatively inexpensive clutch is suitable for a much broader range of uses.

Another important object of my invention is to provide a multiple disk clutch adapted for assembly as a pre-assembled unit onto the flywheel of the automobile, a few bolts being all that is required in the installation of the clutch on the assembly floor, instead of the clutch having to be built up piece by piece in the installation thereof. In that way, the assembling time at the car factory is cut down to an insignificant fraction of the time otherwise necessitated, and a proportionate saving in labor cost is derived. This, furthermore, is of advantage in that the pre-assembled clutch unit can be subjected to test at the factory of the clutch manufacturer before the installation thereof, and in that way the proper performance of the car when completely assembled is assured beforehand.

Another object of my invention consists in providing a clutch open at several points peripherally so that any dirt, grit, or oil that may get between the disks will have an opportunity of escaping so as not to interfere with the proper functioning of the clutch.

The invention is illustrated in the accompanying drawings, wherein—

Figure 1 is a section showing the clutch of my invention as installed;

Fig. 2 is a sectional detail taken on the line 2—2 of Figure 1, looking in the direction of the arrows, and Fig. 3 is a rear view of the clutch removed from the flywheel and showing certain parts broken away for the purpose of better illustration.

The same reference numerals are applied to corresponding parts throughout the views.

The reference numeral 5 is applied to the flywheel, which is arranged to be mounted on the rear end of the crank shaft in the usual way, and provides a central bearing 6 for the front end of the driven shaft 7 that extends rearwardly into the gear box of the transmission. In the usual way, a housing is provided at the front end of the gear box to enclose the flywheel and clutch, and has a plate which, when removed, affords access to the clutch for the purposes of inspection and adjustment.

The clutch embodying my invention comprises a housing 8 arranged to turn with the flywheel and having the driving disks 9 disposed therein between the driven disks 10. The latter are carried on a drum 11 having a center hub 12 splined, as indicated at 13, on the shaft 7. The housing 8, in accordance with my invention, is a sheet metal stamping, generally in the form of a circular disk providing an integral back wall or back plate 14, in lieu of a separate back plate, bent forwardly at three points equally spaced circumferentially of the disk on chords of the circle, as indicated at 15, to provide flat driving faces 16 inside the housing. The driving disks 9 are approximately hexagonal in shape, as illustrated in Fig. 3, and have three of the edges thereof flanged, as shown at 17, and fitting snugly within the housing 8 in engagement with the driving faces 16. The length of contact between each flange 17 and driving face 16 is clearly shown in Fig. 3, and it must be evident that there is much less chance of play being developed between the parts with this sort of a driving connection than where lugs are provided on the periphery of the driving disks and engaged in grooves in the housing. It must also be evident how much more economical this construction is as compared with the other, because of the use of sheet metal stampings in place of machined parts. Pads or facings 18 are suitably secured, as by means of rivets, to the opposite sides of each of the driving disks, and arranged to have frictional driving engagement with the driven disks 10. The latter, like the driving disks, are stamped from sheet metal, and have lugs 19 on the inner periphery thereof slidably received in slots 20 provided in the flanged annular rim 21 of the drum 11. The latter, in keeping with the spirit of this invention, is stamped from sheet metal to the generally channel-shaped cross-section illustrated in Figure 1, and has the edge of the inner annular flange bent at right angles and riveted, as at 22, to the flange of the center hub 12. The latter is preferably forged. A split ring 23, fitting in an annular peripheral groove 24 near the outer edge of the rim 21 of the drum, serves to retain the driven disks 10 on the drum. From the description thus far, it will be evident that the stamped sheet metal construction of the clutch makes for extreme simplicity, compactness and lightness, and avoids a great deal of expensive machine work. For example, it was quite common in multiple disk clutch design to provide a rim cast integral with the flywheel and machined on the inside to provide the grooves for reception of the lugs on the driving disk, and also to provide a forged drum machined on the periphery thereof to provide grooves for the lugs of the driven disks. It is obvious that such construction involved a great deal of weight, and that the machining required made the clutch expensive. Aside from these disadvantages, which are avoided in the present construction, the old construction was invariably not nearly so compact as the present one and could not be used in many cases where the clutch of the present invention will be found suitable.

A pressure plate 25 is stamped from sheet metal in keeping with the spirit of this invention, to avoid the weight and machine work involved in the case of the cast pressure plates, and make for economy, aside from the advantages of lightness and greater compactness. The plate 25 has its inner edge flanged rearwardly, as shown at 26, to make for the desired stiffness and strength and insure the trueness of the front face thereof whereon the pad or facing 18', for cooperation with the rearmost driven disk 10, is secured. For a similar reason, an inturned annular flange 27 is formed on the back wall 14 of the housing defining the central opening 28 provided therein. A plurality of coiled compression springs 29, preferably three sets of them, with any suitable number of springs in each set, five in this case, are interposed between the back wall 14 of the housing and the pressure plate 25. The back wall is suitably struck to provide hollow arcuate beads at three points spaced equally circumferentially of the back wall, as indicated at 30, to accommodate the three sets of springs, and each of these beads has struck-in bosses 31 formed for reception of the rear ends of the springs in the manner shown in Figure 1. Similar struckout bosses 32 are provided on the pressure plate 25 for reception of the other ends of the springs. The elimination of the separate cups or thimbles heretofore required for reception of the springs not only makes for economy, but simplicity and compactness, as well as better appearance, and cuts down the number of parts that has to be handled in assembling.

The back wall 14 of the housing is struck to provide, at three points equally spaced circumferentially of the housing, between the sets of springs 29, a pair of parallel lugs 33 at opposite sides of a hole 34, in which a yoke 35 on the pressure plate 25 is snugly received. The yoke 35 is substantially U-shaped and preferably formed from a piece of sheet metal with the inner ends of the arms of the U bent outwardly, as shown at 36, and riveted or otherwise suitably secured to the back of the pressure plate, but having the cross portion thereof projecting through the back wall sufficiently to permit the entering of the outer end of a release lever 37 in the yoke. The release lever, of which there are three, one for each yoke 35, is suitably stamped from sheet metal to provide oppositely directed ears or knuckles 38 intermediate the ends thereof for reception of a pin 39 for pivotally mounting the lever on the back wall 14. The pin 39 is received in registering notches 40 in the lugs 33, and is of sufficient length to project appreciably beyond both of the lugs. The projecting portions of the pin are annularly grooved, as indicated at 41, to accommodate the coils 42 of a spring 43 of the door spring type, one active end of which bears against the back wall 14, and the other active end against the back of the release lever, as shown, whereby to urge the release lever to turn normally in a clockwise direction, as viewed in Figure 1, so that its outer end will be sure to stay in engagement with a set screw 44 threaded in the yoke 35, and the pin 39 will be sure to stay seated in the notches 40. Each of the springs 43 is so light, as compared with the springs 29, that there is, of course, no perceptible decrease in the pressure with which the plate 25 holds the clutch engaged. The screws 44 are so adjusted that the inner ends of all of the release levers are spaced a predetermined distance from the throw-out collar (not shown) when the clutch is engaged, so that when the clutch pedal is depressed for the release of the clutch, the throw-out collar will come into engagement with all of the levers simultaneously. As the clutch pads or facings become worn, it is obvious that the screws 44 should be backed a turn or so to bring the release levers 37 back to the same relationship with the throw-out collar. A lock nut 45 is provided for each of the set screws 44 to hold the same in adjusted position. The yokes 35 serve as guides for the pressure plate on the back wall of the housing and prevent turning of the pressure plate relative to the housing, in addition to providing a place for connecting the release levers with the pressure plate. These yokes, furthermore, keep the pressure plate in absolutely concentric relation with the housing and the other elements of the clutch, the central position of the pressure plate being obviously determined by the bearing of the yokes between the pairs of lugs 33 disposed in the predetermined angular relationship described. It will be seen that in this phase of the clutch design, as in the other phases, I have adhered to stamped sheet metal construction in preference to the heavier and more costly machined constructions otherwise employed.

A front plate 46, having a pad or facing 18″ on the back thereof for cooperation with the foremost driven disk 10, completes the clutch assembly, and is arranged to be suitably secured to the housing 8 by attachment to flanges 47. I prefer to spot-weld the front plate to the housing at each of the flanges 47, as indicated at 48, and to provide holes 49 through the plate and flanges to receive the bolts 50 for fastening the clutch assembly to the flywheel. In this way the clutch manufacturer, who naturally has facilities for quickly assembling the clutch, can take care of all of the assembling operations on the clutch at the factory and send the clutch to the car manufacturer as a pre-assembled unit for installation on the assembly floor, the only thing that has to be done on the assembly floor being the fastening of the clutch unit to the flywheel by means of the bolts 50, which obviously will take very little time. The clutch manufacturer, by virtue of this arrangement, is enabled to subject the clutch to inspection and test, completely assembled and ready for use, and the car manufacturer is, therefore, assured of uniformity of the clutch manufacturer's product and the proper performance of the clutch in the assembled car. If, perchance, any complaint as to the performance of the clutch should arise, the fact that the front plate is welded to the housing prevents any tampering with the clutch on the part of the employees of the car manufacturer; the clutch will be shipped back to the clutch manufacturer, as is, and the proper adjustment or replacement made. In passing, it will be observed that the housing 8 is left open peripherally at three points equally spaced circumferentially thereof, between the driving faces 16, as indicated at 51. The advantage in this is that any oil, water, dirt or grit that may find its way between the driving and driven disks, will have an opportunity of escaping so as not to interfere with the good performance of the clutch, such foreign matter being thrown out by centrifugal force in the turning of the flywheel, especially when the clutch is disengaged.

It is believed the operation of the clutch is perfectly clear from the foregoing description. The driving and driven disks are held in engagement by the spring pressure active on the pressure plate, and the disengagement of the clutch is brought about in the usual way by operation of the release levers by the throw-out collar.

The claims have been drawn with a view to covering the specific construction disclosed as well as all legitimate modifications and adaptations. It should be understood, for example, that many of the features shown herein as embodied in a multiple disk clutch would be suitable for use in ordinary friction clutches having a single driven clutch disk. The claims should be construed accordingly.

I claim:

1. In a multiple disk clutch, the combination with a driving element, such as a flywheel, and a driven element having a plurality of driven clutch disks, of a housing for the driven disks turning with the driving element, said housing having a plurality of equally circumferentially spaced elongated plain driving faces provided on the inside thereof and openings therebetween, a plurality of driving clutch disks having a plurality of elongated flat portions on the periphery thereof snugly engaging the aforesaid driving faces, and means for releasably engaging the driving and driven disks.

2. A multiple disk clutch comprising the combination with a driving element, such as a flywheel, and a driven element, such as a shaft concentric with the flywheel, of a housing for the clutch arranged to turn with the driving element, the same being formed of sheet metal with a polygonal periphery whereby to provide flat driving surfaces on the inside of the housing, a plurality of driving clutch disks having flat portions on the periphery thereof slidably engaging the aforesaid driving surfaces for the transmission of drive from the housing to the driving clutch disks, each of the driving clutch disks being stamped from sheet metal, the flat peripheral portions thereof being defined by flanges struck from said disks to lend stiffness and make for trueness of the disks and also afford broad contact between the disks and each of the driving surfaces, a driven member on the driven element having a plurality of driven clutch disks carried thereby and projecting between the driving clutch disks, and means for releasably engaging the driving and driven disks.

3. In a friction clutch, the combination with a driving element, such as a flywheel, and a driven element, such as a shaft coaxial with the flywheel, of a housing arranged to turn with the driving element, a driven member within the housing arranged to turn with the driven element, and a driving member in the housing arranged to be turned with the driving element and to transmit drive to the driven member, the driving member being provided at points equally spaced angularly thereof with flat peripheral portions for drive purposes, and the housing being provided on the inside thereof at points correspondingly equally spaced angularly of the periphery thereof with flat driving surfaces for engagement with the flat peripheral portions of the driving member to transmit drive to the latter and being open peripherally at points between the driving surfaces for the purpose described.

4. In a friction clutch, the combination with a driving element, such as a flywheel, and a driven element, such as a shaft coaxial with the flywheel, of a driven member mounted on and arranged to turn with the driven element, a driving member cooperating with the driven member and arranged to be turned with the driving element, and a housing for the driving and driven members, said housing being formed from a single piece of sheet metal to provide a back wall in a plane parallel with the driving and driven members, and flat peripheral walls equally spaced circumferentially of the housing, the inside surfaces of said flat peripheral walls serving as driving faces, the driving member having flat peripheral portions engaging the said inside surfaces for the transmission of power from the housing to the driving member, and said housing being open peripherally between the flat peripheral walls.

5. A clutch as set forth in claim 4, wherein the housing is further formed to provide outwardly projecting flanges at the front end of the flat peripheral walls, said flanges providing a place for attaching the housing to the driving element.

6. In a friction clutch, the combination with the back plate and pressure plate, of a plurality of yoke members, each formed from a single piece of sheet metal to approximately U-form with the ends of the arms of the U suitably secured to the back of the pressure plate, and with the rest of the U projecting through a guide opening provided therefor in the back plate, there being spring means acting between the back plate and the pressure plate normally urging the latter away from former, and a plurality of release levers, one for each of the yoke members, each pivotally mounted on the back plate intermediate the ends thereof and having the outer end extending into the projecting end of the yoke member associated therewith, and having the inner end arranged to have pressure exerted thereon for moving the pressure plate against the action of the spring means.

7. In a friction clutch, the combination with the back plate and pressure plate, of a plurality of yoke members, each formed from a single piece of sheet metal to approximately U-form with the ends of the arms of the U suitably secured to the back of the pressure plate, and with the rest of the U projecting through a guide opening provided therefor in the back plate, there being spring means acting between the back plate and the pressure plate normally urging the latter away from the former, and a plurality of release levers on the back of the back plate, one for each of the yoke members, each of said levers being extended through the projecting end of the yoke member associated therewith and pivoted on the back plate whereby when movement is communicated to the release lever the pressure plate is moved against the action of the spring means.

8. A clutch as set forth in claim 7, wherein the back plate is formed of sheet metal stamped to provide a pair of outwardly projecting parallel lugs at opposite sides of each of the guide openings slidably engaging the outside of the arms of the yoke member projecting through the guide opening, and wherein the release lever associated with the yoke member has a pintle for pivotally mounting the same on the back plate received at its ends in the aforesaid lugs.

9. A clutch as set forth in claim 7 wherein each of said release levers is stamped from sheet metal of the proper width to fit neatly in the projecting end of the yoke member associated therewith, there being a pintle for pivotally mounting the same on the back plate, each of said levers being struck so as to provide oppositely directed knuckles for reception therein of the pintle in transverse relation to the lever.

10. A clutch as set forth in claim 7, wherein the back plate is formed of sheet metal stamped to provide a pair of outwardly projecting parallel lugs at opposite sides of each of the guide openings slidably engaging the outside of the arms of the yoke member projecting through the guide opening, there being a pintle for pivotally mounting a release lever on the back plate received at its ends in the aforesaid lugs, and the release lever associated with the yoke member being stamped from sheet metal to the proper width to fit neatly in the projecting end of the yoke member, the said release lever being further struck to provide oppositely directed knuckles thereon for reception of the pintle therein in transverse relation to the lever.

In witness of the foregoing I affix my signature.

CARL A. RUESENBERG.